United States Patent
Tiberghien

(10) Patent No.: US 8,033,524 B2
(45) Date of Patent: Oct. 11, 2011

(54) FEMALE CONNECTOR ELEMENT AND CONNECTOR INCORPORATING SUCH AN ELEMENT

(75) Inventor: Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 595 days.

(21) Appl. No.: 11/905,919

(22) Filed: Oct. 5, 2007

(65) Prior Publication Data

US 2008/0088127 A1    Apr. 17, 2008

(30) Foreign Application Priority Data

Oct. 13, 2006   (FR) ...................................... 06 08999

(51) Int. Cl.
*F16L 37/28* (2006.01)
(52) U.S. Cl. ..................................... 251/149.6; 285/307
(58) Field of Classification Search ............. 137/614.03, 137/614.05; 251/149.1, 149.6; 285/95, 307, 285/318, 321
See application file for complete search history.

(56) References Cited

U.S. PATENT DOCUMENTS

| | | | | | |
|---|---|---|---|---|---|
| 3,058,717 | A | * | 10/1962 | Wiltse | 251/149.6 |
| 4,060,219 | A | * | 11/1977 | Crawford | 251/149.6 |
| 4,612,953 | A | | 9/1986 | Caroll | |
| 4,792,115 | A | | 12/1988 | Jindra | |
| 5,074,524 | A | | 12/1991 | Wade | |
| 6,279,874 | B1 | * | 8/2001 | Nyberg | 251/149.6 |

FOREIGN PATENT DOCUMENTS

| FR | 2 166 770 | | 8/1973 |
|---|---|---|---|
| FR | 2166770 | A5 * | 8/1973 |

* cited by examiner

*Primary Examiner* — John Fristoe, Jr.
*Assistant Examiner* — Andrew J Rost
(74) *Attorney, Agent, or Firm* — Dowell & Dowell, PC

(57) ABSTRACT

This female connector element (A) is able to receive a male element (B) by fitment and comprises a seal (25), housed inside a body (21) of the element and able to interact in a sealed manner with a peripheral surface (13) of a male element (B). The female element (A) also comprises an interface member (27), housed inside the body (21) and able to move in translation parallel to the axis of fitment (X-X'). The interface member (27) is able to be moved axially by a male element (B) during fitment into the female element, from a first position, in which it is inserted radially between the seal (25) and the peripheral surface (13) of the male element, to a second position, in which it is offset axially relative to the seal (25) and the seal (25) rests in a sealed manner on the peripheral surface (13) of the male element.

18 Claims, 5 Drawing Sheets

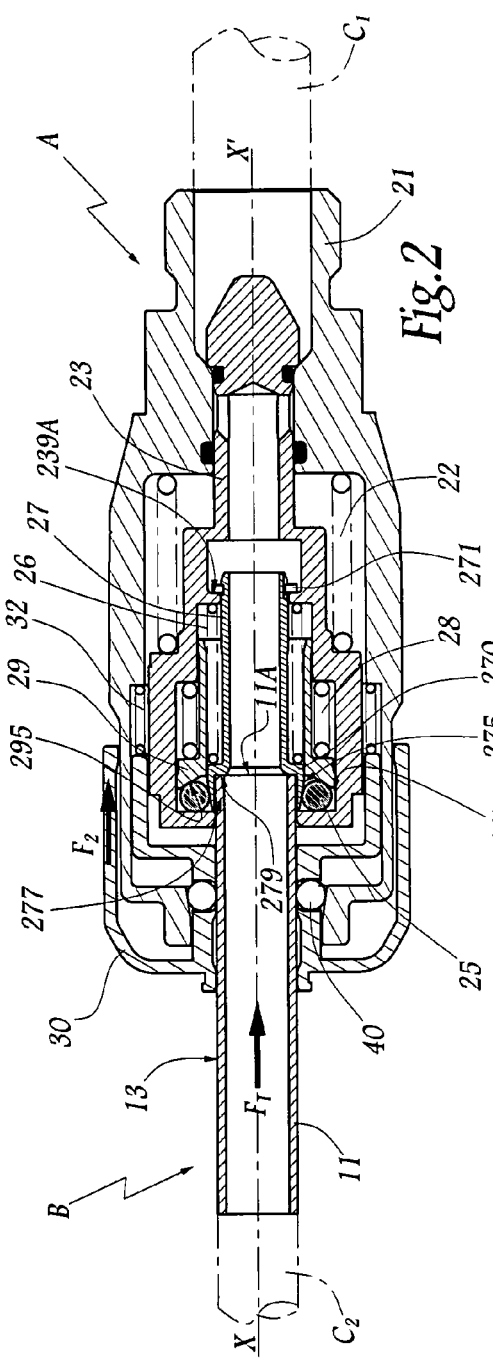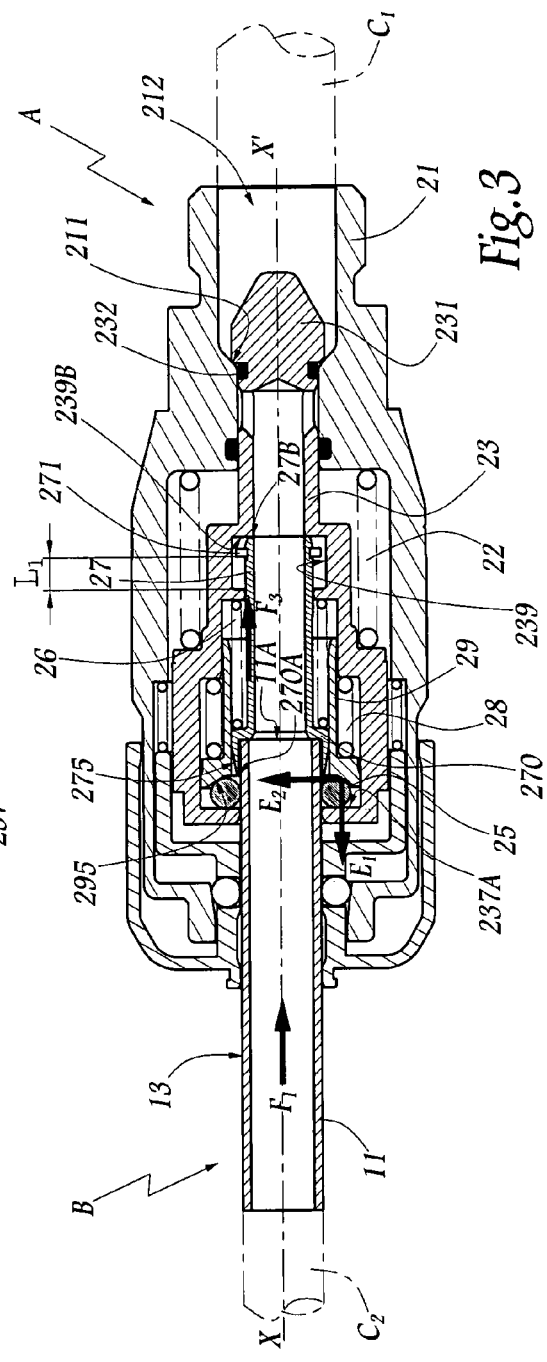

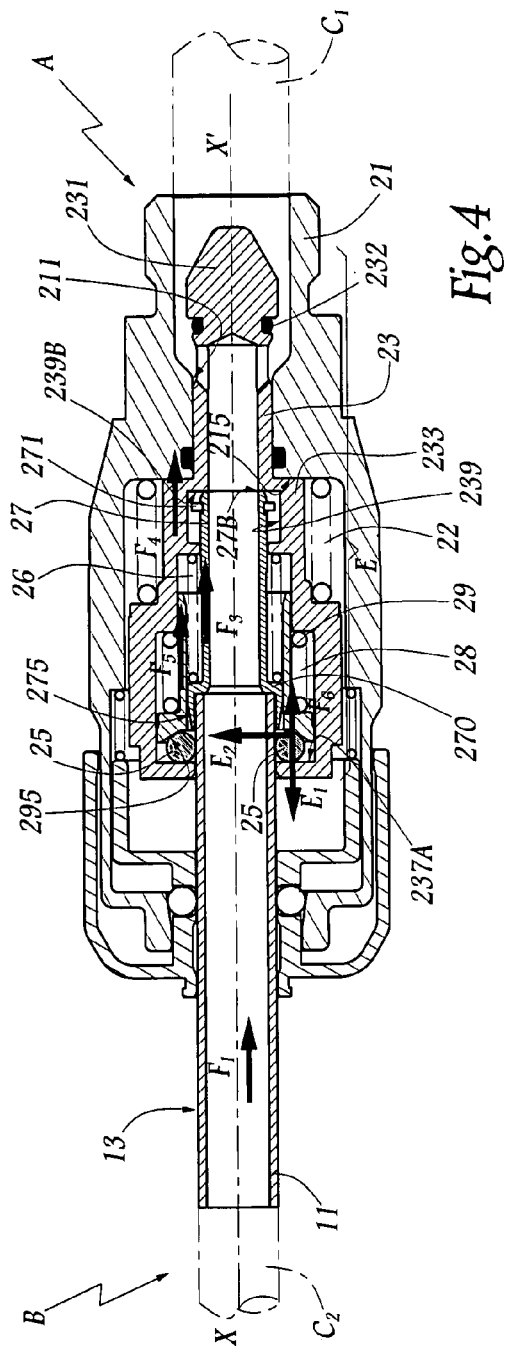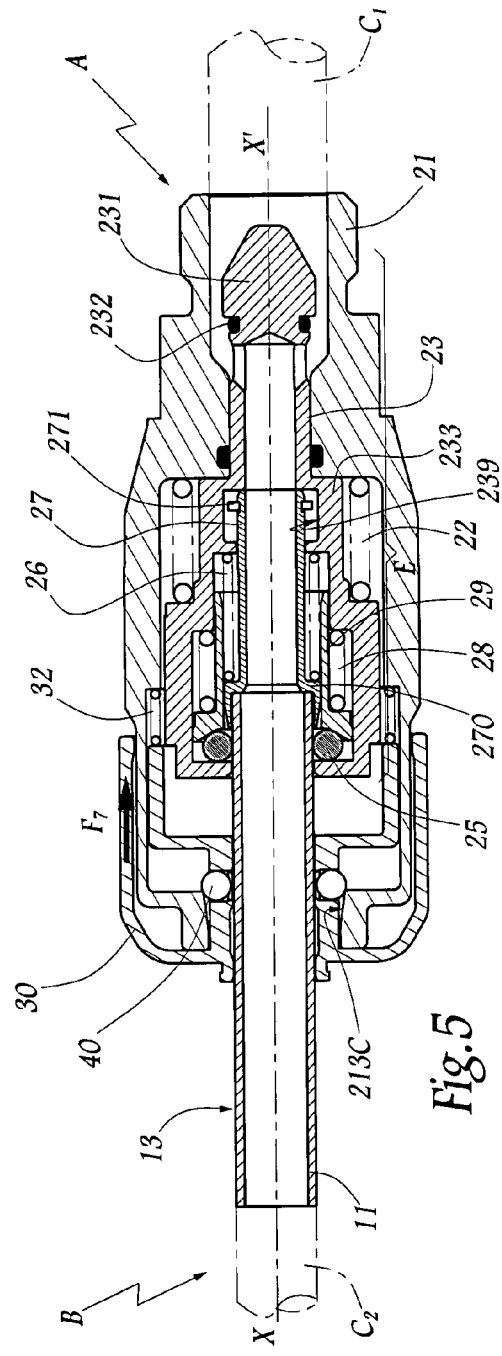

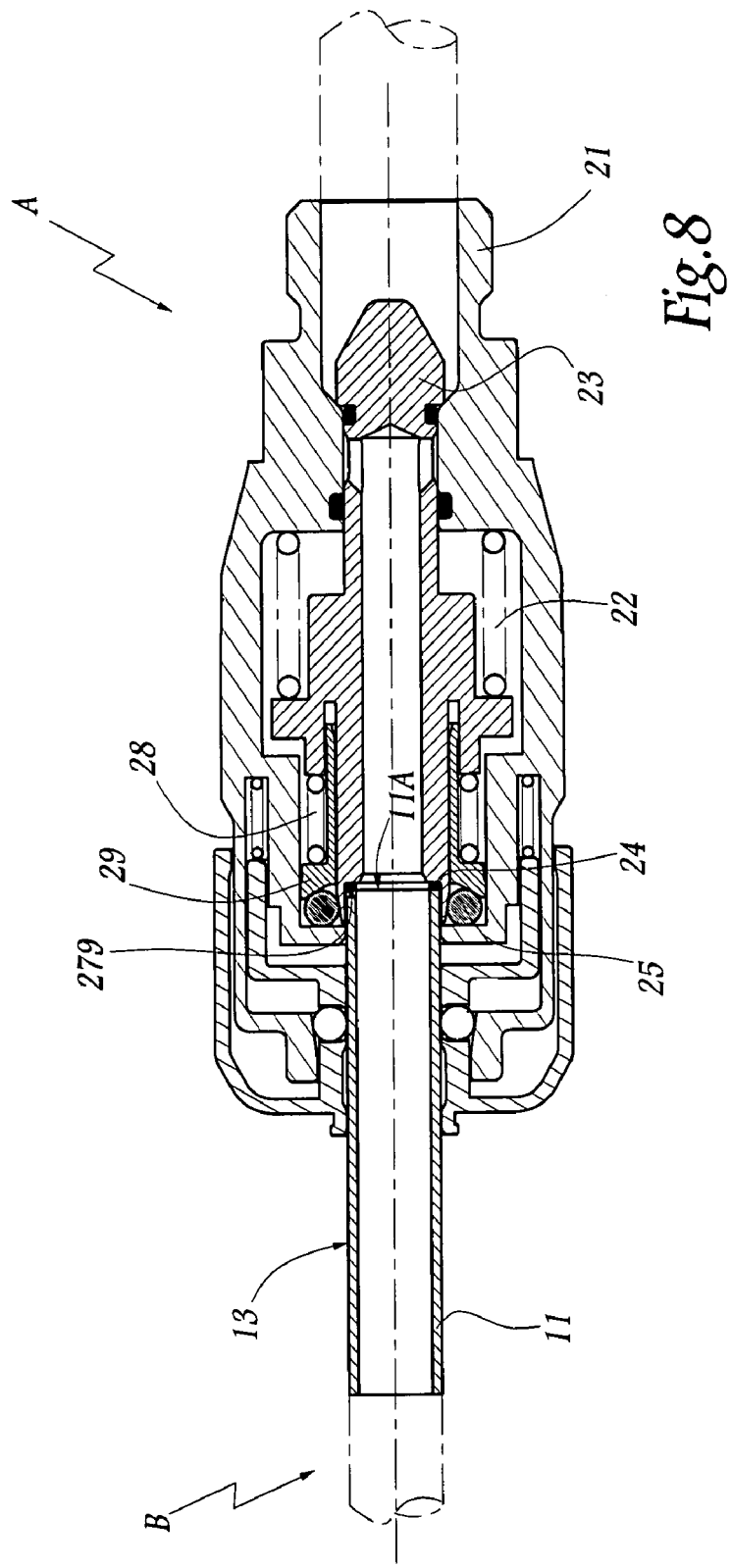

FEMALE CONNECTOR ELEMENT AND CONNECTOR INCORPORATING SUCH AN ELEMENT

BACKGROUND OF THE INVENTION

1. Field of the Invention

The present invention relates to a female connector element designed for removably joining ducts through which a pressurized fluid flows and a connector comprising such a female element and a smooth cylindrically terminated male element.

2. Brief Description of the Related Art

It is a known practice to removably connect a smooth cylindrically terminated male element, such as a tube, to a duct through which a pressurized fluid flows with the aid of a female connector element provided with sealing means. In particular, such a female element conventionally comprises an O-ring seal, placed in an internal groove of the female element and chosen with an internal diameter at rest that is slightly less than the external diameter of the tube, in order to seal the connection. When the tube is inserted into the body of the female element, the seal is forced by the end of the tube until a sufficient radial expansion of the seal is obtained to allow the tube to pass. The interaction between the end of the tube and the seal causes a rapid deterioration of the seal that is also helped by the presence of protruding irregularities on the surface of the tube, resulting for example from its sectioning. The sealing property and the service life of the seal are then substantially reduced, which causes a risk of leakage during connections and requires frequent replacements of the seal.

It is these disadvantages that the invention is intended most particularly to alleviate by proposing a female connector element allowing a sealed connection of a tube and a duct through which a pressurized fluid flows, without deterioration of the sealing means.

SUMMARY OF THE INVENTION

Accordingly, the subject of the invention is a female element of a connector designed for the removable joining of ducts through which a pressurized fluid flows, this female element being able to receive a male element by fitment along a longitudinal axis, the female element comprising a seal, housed inside a body of the female element and able to interact in a sealed manner with a peripheral surface of a male element fitted into the female element, characterized in that the female element also comprises an interface member, housed inside the body of the female element and able to move in translation parallel to the fitment axis, this interface member being capable of being moved axially by a male element during fitment into the female element, from a first position, in which the interface member is inserted radially between the seal and the peripheral surface of the male element, to a second position, in which the interface member is offset axially relative to the seal and the seal rests in a sealed manner on the peripheral surface of the male element.

According to other optional features of the invention, taken in isolation or in all technically possible combinations:

- the interface member is able to be moved axially from the second position to the first position during the uncoupling of the female element from a male element fitted into the female element;
- the female element comprises elastic return means capable of axially pushing the interface member towards the first position;
- the interface member has a minimum thickness at its end closest to the seal in the second position of the interface member;
- the interface member comprises a peripheral surface that is inclined relative to the axis of fitment, this surface being able to receive the seal pressing thereon when the interface member is inserted radially between the seal and the peripheral surface of a male element fitted into the female element;
- the female element comprises loading means for loading the seal in the direction of the peripheral surface of a male element fitted into the female element;
- the loading means comprise an auxiliary member able to exert on the seal an axial force directed against the movement of the interface member from the first position to the second position;
- the auxiliary member comprises a peripheral surface that is inclined relative to the axis of fitment, able to exert on the seal a radial force directed towards the peripheral surface of a male element during fitment into the female element;
- the female element comprises a valve for closing the female element, housed inside the body and able to move in translation parallel to the axis of fitment, this valve being able to be moved axially against elastic return means by a male element during fitment into the female element;
- the valve comprises a groove for receiving the seal;
- the interface member is able to slide, relative to the valve, against first elastic return means, while the valve is able to slide relative to the body against second elastic return means, the first means exerting a return force that is weaker than the return force of the second means;
- the interface member is integral in movement with the valve;
- the female element comprises a second seal placed in a shoulder of the interface member designed to receive in abutment a male element during fitment into the female element;
- the internal diameter of the seal when the interface member is in the first position is greater than the internal diameter of the seal when the interface member is in the second position, the seal interacting in a sealed manner with the outer peripheral surface of a male element during fitment into the female element when the interface member is in the second position;
- during the movement of the interface member from a position corresponding to an uncoupled configuration of the female element to the second position, the seal reaches at least one configuration in which the internal diameter of the seal is greater than the internal diameter of the seal when the female element is in an uncoupled configuration;
- the seal stretches against the inner peripheral surface of a male element during fitment into the female element during the movement of the interface member from the first position to the second position;
- the female element comprises a mechanism for locking a male element during fitment and in the fitted configuration in the female element, this mechanism comprising locking members, suitable for interacting with a peripheral surface of the male element, and a locking ring, that can be moved in translation relative to the body and parallel to the axis of fitment, this ring being able, under the action of elastic return means, to radially push the locking members in the direction of the axis of fitment along a peripheral surface of the body that is inclined relative to the axis of fitment.

The invention also relates to a connector for removably joining ducts through which a pressurized fluid flows, comprising a smooth cylindrically terminated male element and a female element able to fit into one another, the female element being as described above.

BRIEF DESCRIPTION OF DRAWINGS

The features and advantages of the invention will appear in the following description of four embodiments of a female connector element and of a connector according to the invention, given only as an example and made with reference to the appended drawings in which:

FIG. 2 is a section similar to FIG. 1, during a first step of connecting the male and female elements;

FIG. 3 is a section similar to FIG. 1, during a second step of connecting the male and female elements;

FIG. 4 is a section similar to FIG. 1, in a connected configuration of the male and female elements;

FIG. 5 is a section similar to FIG. 1, during the uncoupling of the male and female elements;

FIG. 8 is a section similar to FIG. 1 for a connector according to a fourth embodiment of the invention.

In the above drawings, the connector elements have been simplified for the purpose of clarity. In addition, in FIGS. 6 and 7, the parts that are identical to the first embodiment have not been shown.

DESCRIPTION OF THE PREFERRED EMBODIMENT

Figure 1:
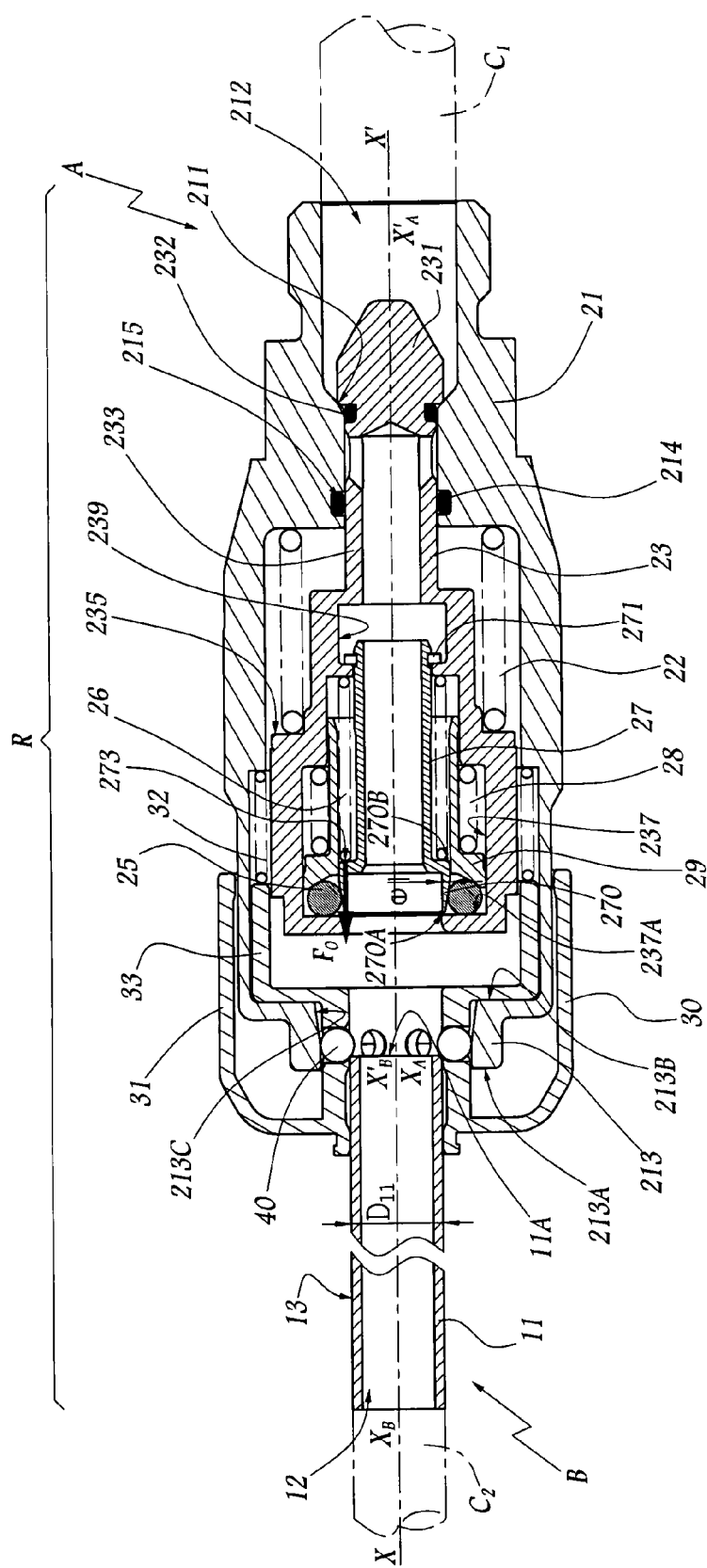
FIG. 1 is a longitudinal section of a connector according to a first embodiment of the invention, in an uncoupled configuration of its male and female elements.

The connector R shown in FIG. 1 comprises a female element A and a male element B designed to fit into one another in the direction of an axis of fitment X-X', that is a longitudinal axis common to the elements A and B. Within the meaning of the invention, "the front" of the element A or B means the portion of this element that is designed to be directed towards the other element to obtain the fitment, "the rear" of the element being the portion at the other end. By extension, "the front" of a part forming the element A or B means the portion of that part that is directed towards the front of the element.

The rear portion of the female element A is fluidically connected to a first duct $C_1$, while the rear portion of the male element B is connected to a second duct $C_2$. As an example, the male element B is connected to a filler pipe for cooling fluid of a refrigerator not shown, while the female element A is connected via the duct $C_1$ to a tank not shown of pressurized cooling fluid.

The male element B comprises a tubular body 11 with a circular section, to which the duct $C_2$ is connected and which defines an inner channel 12 for circulation of fluid. The male element B has a symmetry of revolution about a central axis $X_B$-$X'_B$, that is indistinguishable from the axis X-X' during the fitment of the male element B into the female element A.

The male element B is provided with a smooth cylindrical end 11A for its fitment into the female element A.

The female element A comprises a tubular body 21, to which the duct $C_1$ is connected. The body 21 defines a central channel 212 in which is placed a valve 23 that can be moved in translation parallel to an axis $X_A$-$X'_A$ which is a central axis of the element A, indistinguishable from the axis X-X' during the fitment of the elements A and B.

The valve 23 comprises a solid portion 231 and a hollow portion 233, the solid portion 231 being designed to press sealingly against a seat 211 formed by the body 21. More precisely, the solid portion 231 is fitted with an O-ring seal 232 designed to press against the seat 211, so as to close off the channel 212. In addition, the body 21 is provided with an internal groove 215 for receiving an O-ring seal 214 against which the hollow portion 233 presses. A spring 22 exerts on an outer shoulder 235 of the valve 23 an elastic force tending to press the portion 231 fitted with the seal 232 against the seat 211, that is to say to close the channel 212 of the female element A.

A mouth 213 of the front portion of the body 21, at the other end from the duct $C_1$, is fitted with a locking ring 30 comprising an outer operating sheath 31, placed around the body 21, and an inner sleeve 33. The inner sleeve 33 is elastically loaded by a spring 32 in order to push locking balls 40 towards the front end 213A of the mouth 213. The balls 40 are able to interact with an inner peripheral surface 213C of the mouth 213, that is frustoconical and inclined relative to the axis of fitment X-X' so as to travel away from this axis while going from the front end 213A to the rear end 213B of the mouth 213. Two locking balls 40 are visible in the figures. In practice, the female element A comprises more than two balls 40 distributed about the axis $X_A$-$X'_A$, for example six balls.

The female element A comprises an O-ring seal 25, installed in an inner groove 237 of the hollow portion 233 of the valve 23. The seal 25 is designed to interact in a sealed manner with the outer peripheral surface 13 of the male element B, in order to seal the connection of the elements A and B in the coupled configuration of these elements. Accordingly, the seal 25 is chosen with an internal diameter at rest that is slightly smaller than the external diameter $D_{11}$ of the body 11 of the male element B. In addition, the seal 25 is made of a polymer suited to the type of fluid designed to flow through the connector R and has good properties of stretchability. In the example shown, the body 11 has an external diameter $D_{11}$ of the order of 9.8 mm, while the seal 25 has an internal diameter at rest of the order of 9 mm and is able to be stretched until an internal diameter of the stretched seal is obtained that is of the order of 1.2 times the internal diameter of the seal at rest.

As shown in FIG. 1, the seal 25 is mounted stretched around a front portion 270 of an interface ring 27, housed inside the hollow portion 233 of the valve 23. The interface ring 27 is able to slide inside the hollow portion 233, parallel to the axis of fitment X-X'. The axial movement of the interface ring 27 is limited by the length of an inner groove 239 of the hollow portion 233 in which an outer radial collar 271 of the interface ring 27 slides. More specifically, the axial movement of the interface ring 27 is limited towards the front of the female element A by the collar 271 butting against the front side 239A of the groove 239, and towards the rear of the element A by the rear end 27B of the interface ring 27 butting against the rear side 239B of the groove 239. The amplitude of sliding of the collar 271 in the groove 239 is marked $L_1$, that is to say the length traveled by the collar 271 between the position in which the collar 271 is butting against the front side 239A of the groove 239 and the position in which the rear end 27B is butting against the rear side 239B of the groove 239.

A spring 26 exerts on an outer shoulder 273—of the interface ring 27 an axial elastic force $F_0$ tending to push the portion 270 towards the front side 237A of the groove 237 for receiving the seal 25, this movement being limited by the collar 271 butting against the front side 239A of the groove 239.

The seal 25 is kept pressed against the front side 237A of the groove 237 by an auxiliary ring 29 elastically loaded by a spring 28. The auxiliary ring 29 is placed around the interface ring 27 and can be moved in translation inside the hollow portion 233, parallel to the axis of fitment X-X'. The interface ring 27 and the auxiliary ring 29 can be moved in translation in the hollow portion 233 independently of one another parallel to the axis X-X'.

In the uncoupled configuration that can be seen in FIG. 1, the seal 25 is confined in the groove 237, pressing against the front side 237A. More specifically, the auxiliary ring 29 interacts with the seal 25 at an inner peripheral frustoconical surface 295 of the ring 29. The incline of the surface 295 relative to the axis of fitment X-X' is such that the elastic force of the spring 28 is transmitted to the seal 25 in the form of an axial force tending to press the seal 25 against the front side 237A of the groove 237, associated with a radial force, directed towards the axis of fitment X-X'. However, in the uncoupled configuration, any radial movement for relaxing the seal 25 is prevented by the front portion 270 of the interface ring 27.

An outer peripheral surface 275 of the front portion 270, designed to receive the seal 25, is inclined relative to the axis of fitment X-X' so as to move away from this axis while going from the front end 270A to the rear end 270B of the portion 270. In addition, the portion 270 has a thickness e that increases from the front end 270A to the rear end 270B. In the example shown, the minimum thickness e of the portion 270, at the end 270A, is of the order of $0.5$ mm. Therefore, a minimum increase in the internal diameter of the seal 25 in the configuration of FIG. 1 is of the order of 1 mm. As a variant, and in particular according to the material forming the interface ring 27, the minimum thickness e of the portion 270 may be different from 0.5 mm, while ensuring a minimum increase of the internal diameter of the seal 25 of the order of 1 mm in the uncoupled configuration.

When it is appropriate to fit the male element B into the female element A, the latter elements are brought closer to one another, as shown by the arrow $F_1$ of FIGS. 2 to 4. The front end 11A of the male element B pushes the locking balls 40, which pass over into the channel 212, radially outwards against the frustoconical surface 213C of the mouth 213. The result of this is a movement of the locking ring 30 towards the rear of the body 21, against the spring 32, as shown by the arrow $F_2$ of FIG. 2. The rearward movement of the locking ring 30 continues until the balls 40 are sufficiently out of the way to allow the body 11 of the male element B to pass. When such a distance of the balls 40 is reached, the locking ring 30 is no longer pushed to the rear of the body 21, despite the forward movement of the body 11. From this position of the locking ring 30, the spring 32 exerts on the balls 40, via the inner sleeve 33, a force tending to push them towards the front end 213A of the mouth 213, along the frustoconical surface 213C. The resultant of the forces exerted by the balls 40 on the male element B then opposes a withdrawal of the male element B from the female element A, that is to say a movement shifting the male element B rearwards. On the other hand, the forward movement of the male element B in the direction of connection is not blocked by the balls 40, thanks to the incline of the surface 213C.

When it moves forward into the body 21, the male element B is received in a recess 277, defined on the front portion 270 of the interface ring 27. Therefore, when the front end 11A of the male element B traverses the section of the O-ring seal 25, the front portion 270 of the interface ring 27 is inserted radially between the end 11A of the male element B and the seal 25. No contact is therefore made between the end 11A and the seal 25, which eliminates any risk of damage to the seal 25 by the end 11A. The male element B continues its forward movement into the body 21 until it butts against an inner shoulder 279 of the interface ring 27 delimiting the bottom of the recess 277, as shown in FIG. 2.

The closing force $F_1$ being maintained on the male element B, the latter continues its forward movement into the body 21, while butting against the shoulder 279 of the interface ring 27. The result of this is a concomitant movement of the interface ring 27 against the spring 26. This movement is shown by the arrow $F_3$ of FIG. 3 and slides the collar 271 of the interface ring 27 along the groove 239 of the valve 23. In this step, only the interface ring 27 follows the forward movement of the male element B because the return forces of the springs 22 and 28, associated respectively with the valve 23 and the auxiliary ring 29, are greater than the return force of the spring 26 associated with the interface ring 27.

The auxiliary ring 29 is pushed by the spring 28 towards the front side 237A of the groove 237, so that the frustoconical surface 295 exerts on the seal 25 an axial force $E_1$ opposing the backward movement $F_3$ of the interface ring 27. Because of the incline of the surface 295, this axial force $E_1$ is accompanied by a radial force $E_2$ tending to push the seal 25 radially towards the axis of fitment X-X'. These forces $E_1$ and $E_2$ associated with the rearward movement $F_3$ of the interface ring 27 to a position in which it is axially offset relative to the seal 25, allow the seal 25 to slide along the frustoconical surface 275 of the portion 270 and to progressively shrink until it rests against the outer peripheral surface 13 of the male element B, at a sufficient distance from the end 11A of the male element B so as not to be in contact with protruding irregularities that may be present on this end.

The axial force $E_1$ exerted by the auxiliary ring 29 on the seal 25 compresses the seal 25 against the front side 237A of the groove 237, which helps to press the seal 25 against the outer peripheral surface 13 of the male element B, while compensating for any remanence of the seal 25 that changes from a stretched geometry to its operating geometry. This operating geometry can be seen in FIGS. 3 to 5.

When the seal 25 interacts in a sealed manner with the outer peripheral surface 13 of the male element B, the rear end 27B of the interface ring 27 has not yet reached abutment against the rear side 239B of the groove 239. The solid portion 231 of the valve 23 fitted with the seal 232 is then still pressing sealingly against the seat 211, under the elastic action of the spring 22, so that the channel 212 of the female element A remains closed. Therefore, the valve 23 opens the circuit only once the connection is sealed by the leaktight pressing of the seal 25 against the outer peripheral surface 13 of the male element B. This operational security results from the ability of the interface ring 27 to slide relative to the valve 23 and from the difference of return force exerted by the spring 22, associated with the valve 23, and by the spring 26, associated with the interface ring 27.

The closing force $F_1$ being maintained on the male element B, the latter continues to push the interface ring 27 against the spring 26, in the direction of the arrow $F_3$ of FIG. 3. The rear end 27B of the interface ring 27 then comes to butt against the rear side 239B of the groove 239, as shown in FIG. 3, and transmits the movement of the male element B to the valve 23, which in its turn moves rearwards against the spring 22 as shown by the arrow $F_4$ of FIG. 4. Thus, the solid portion 231 of the valve 23 fitted with the seal 232 is moved away from its seat 211, which opens the circuit and places the ducts $C_1$ and $C_2$ in communication. The auxiliary ring 29 being connected to the valve 23 by means of the spring 28, the movement of the male element B induces a concomitant movement in the female element A of the assembly E comprising the valve 23, the interface ring 27, the auxiliary ring 29 and the seal 25, as shown by the arrows $F_3$ to $F_6$ of FIG. 4. In this step, the forces $E_1$ and $E_2$ pressing the seal 25 against the outer peripheral surface 13 of the male element B, exerted by the auxiliary ring 29, are maintained, since it is the whole assembly E that moves. In addition, the seal 25 and the male element B being moved simultaneously, the inner surface of the seal is no longer acted upon by the forward movement of the male element B.

The movement of the assembly E of the elements 23, 25, 27 and 29 continues until an outer radial shoulder of the hollow portion 233 of the valve 23 reaches abutment against an inner shoulder 215 of the body 21, as shown in FIG. 4. The connector R is then in the connected configuration of its female A and male B elements.

As emerges from the connection steps described above, the connection of the elements A and B is a three-stage connection, which comprises pushing the male element B into contact with the interface ring 27 against the spring 26, while the valve 23 closes the circuit, then pushing the assembly E of the elements 23, 25, 27 and 29 against the spring 22, until the valve 23 reaches the abutment 215 of the body 21 and opens the circuit.

When the circuit is open, the pressure of circulation of the fluid flowing in the ducts $C_1$ and $C_2$ tends to push the valve 23 in the direction of the seat 211. This helps to push the auxiliary ring 29, linked to the valve 23 by the spring 28, towards the seal 25. The result of this is an amplification of the forces $E_1$ and $E_2$ exerted by the auxiliary ring 29 on the seal 25.

The elements A and B of the connector R of the invention are uncoupled by exerting on the locking ring 30, and by maintaining, until complete disconnection, an axial force directed towards the duct $C_1$ against the spring 32 as shown by the arrow $F_7$ of FIG. 5. The locking balls 40 are therefore moved along the frustoconical surface 213C and move away, in an outward radial movement, from the zone in which the male element B travels in the female element A, so that they no longer block the movement of the male element B in the direction of disconnection. The spring 22 is then able, without resistance, to push away the assembly E formed by the valve 23, the interface ring 27, the auxiliary ring 29 and the seal 25, and the male element B. The interface ring 27 and the male element B are pushed by the spring 26 which exerts a return force that is weaker than that of the spring 22, so that the solid portion 231 of the valve 23 fitted with the seal 232 comes to sealed abutment against the seat 211 and closes the channel 212 of the female element A before the interface ring 27, under the action of the spring 26, comes into contact with the seal 25. Therefore, the seal is maintained as long as the circuit is partially open. In this manner, the elements A and B return to the configuration of FIG. 3.

When the solid portion 231 of the valve 23 is pressing against the seat 211, the force exerted by the spring 26 moves the front end 270A of the interface ring 27 into contact with the seal 25. The incline of the frustoconical surface 275 allows the transmission of a radial force, directed away from the axis of fitment X-X', on the inner surface of the seal 25. The result of this is a progressive stretching of the seal 25 around the surface 275, as the interface ring 27 gradually moves away from the duct $C_1$. The movement of the interface ring 27 away from the duct $C_1$ continues until the collar 271 comes to butt against the front side 239A of the groove 239. The interface ring 27 therefore resumes its initial position, in which the front portion 270 is inserted radially between the seal 25 and the outer peripheral surface 13 of the male element B. In this position, the portion 270 of the interface ring 27 and the auxiliary ring 29 confine the seal 25 in the groove 237 of the valve 23, so that the seal 25 is protected from any contaminant likely to be detached from the male element B when the latter is inserted into the recess 277 of the interface ring 27 or is removed therefrom. In addition, the abutment of the collar 271 against the front side 239A of the groove 239 limits the forward movement of the interface ring 27 away from the duct $C_1$, which makes it possible to prevent the end 270A making contact with the groove 237.

The male element B may then be extracted from the female element A by an operator, who still keeps the locking ring 30 in the rearward position in the direction of the duct $C_1$. When the front end 11A of the male element B traverses the section of the seal 25, the latter is again protected from any contact with the end 11A by the portion 270 of the interface ring 27, inserted between the seal 25 and the end 11A of the male element B.

In order to obtain an effective stretching of the seal 25 around the frustoconical surface 275 of the interface ring 27, the portion 270 is designed with a minimum thickness e at its front end 270A. In addition, the seal 25 is chosen with a relatively large toric diameter, so that the stretching force is effectively applied at a distance from the centre of the section of the O-ring 25.

As a variant, the seal 25 may be mounted without stretching around the front portion 270 of the interface ring 27, the auxiliary ring 29 then being designed to compress the seal 25 against the peripheral surface 13 of the male element B in the retracted position of the interface ring 27. The seal 25 then interacts in a sealed manner with the surface 13, so that it seals the connection of the elements A and B in the coupled configuration of these elements. In this variant, the geometry of the auxiliary ring 29, and in particular the incline of the frustoconical surface 295, is adapted to achieve the desired compression of the seal 25 and its pressing against the peripheral surface 13 of the male element B.

A female element A according to this first embodiment of the invention therefore allows a smooth cylindrically terminated male element B to be connected with the female element A without damage to the seal 25. Similarly, the uncoupling of the elements A and B does not damage the seal 25. Specifically, any contact between the front end 11A of the male element and the seal 25 is eliminated thanks to the interface ring 27. Therefore, the reliability and the service life of the seal 25 are increased, which reduces the risk of leakage during a connection and the frequency of replacing the seal 25.

In addition, the three-stage connection and disconnection of a connector R according to this first embodiment makes it possible to seal the connection of the elements A and B. Via an appropriate design of the female element A, and in particular via an appropriate choice of the return forces of the springs 22 and 26 and of the amplitude $L_1$ of sliding of the collar 271 in the groove 239, it is specifically possible to uncouple the phase of compression/stretching of the seal 25 relative to the outer peripheral surface 13 of the male element B and the phase of opening or closing the circuit via the valve 23. Increased security of operation of the connector R is thereby obtained.

Figure 6:
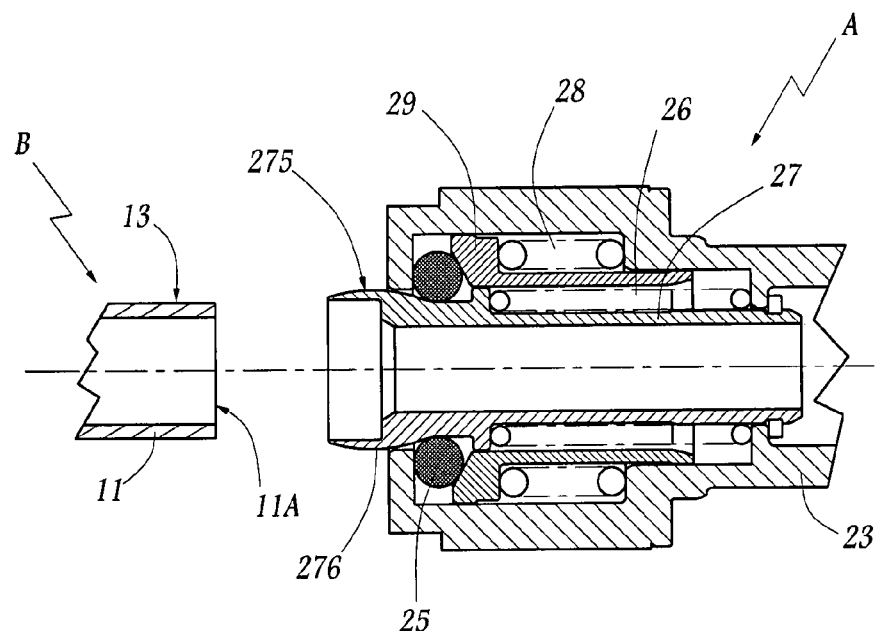
FIG. 6 is a partial longitudinal section of elements forming a connector according to a second embodiment of the invention.

In the second embodiment shown in FIG. 6, the elements similar to elements of the first embodiment bear identical reference numbers. In this second embodiment, the interface ring 27 is designed with an outer peripheral surface 275 having two opposite inclines forming a boss 276. When the female element A is in the uncoupled configuration, the seal 25 is placed in the bottom portion of the boss 276, laterally on the rear relative to the summit of the boss, and has a limited stretch or no stretch relative to the rest configuration of the seal 25. When the male element B is fitted into the female element A and butts against the interface ring 27, the latter accompanies the movement of the male element B, to a position in which the interface ring 27 is axially offset relative to the seal 25, which moves the boss 276 relative to the seal 25. The seal 25 is first stretched. The front portion of the interface ring 27 is then inserted radially between the seal 25 and the front end 11A of the male element B. The stretch is maximum when the seal 25 reaches the summit of the boss 276, then the seal 25 shrinks progressively along the downslope of the surface 275 until it is pressed against the peripheral surface 13 of the male element B. In this position, the seal 25 interacts in a sealed manner with the surface 13 so that it seals the connection of the elements A and B in the coupled configuration of these elements. This second embodiment therefore makes it possible to prevent problems of remanence of the seal 25 resulting from an extended stretch in the uncoupled configuration of the female element A, while protecting the seal 25 during coupling and uncoupling. The result of this is an improved sealing efficiency.

Figure 7:
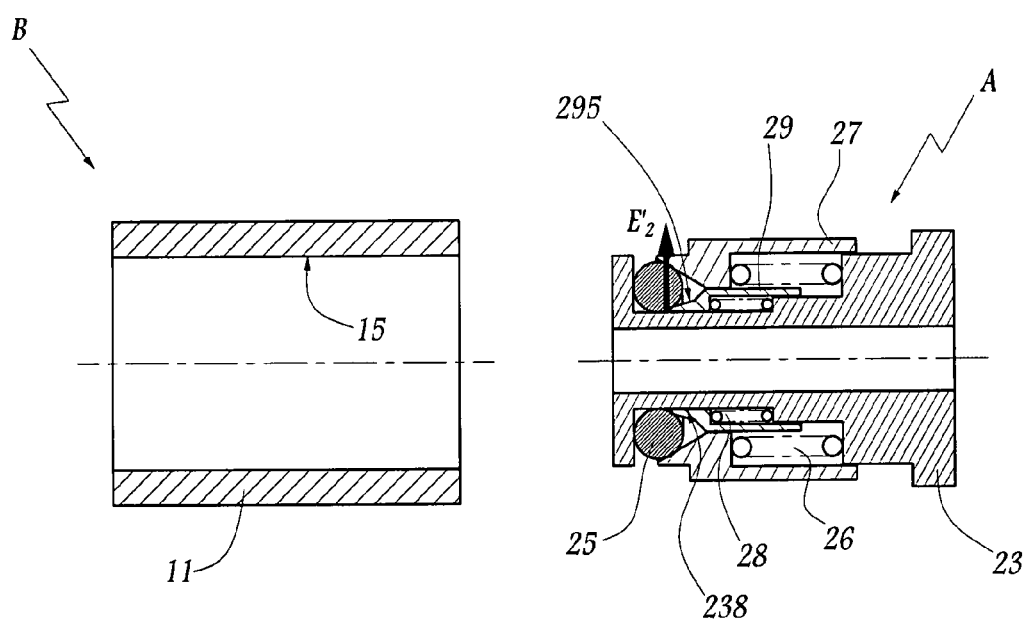
FIG. 7 is a partial longitudinal section of elements forming a connector according to a third embodiment of the invention.

In the third embodiment shown in FIG. 7, the elements similar to the elements of the first embodiment bear identical reference numbers. In this third embodiment, the seal 25 is designed to interact in a sealed manner with an inner peripheral surface 15 of the male element B in order to seal the connection of the elements A and B in the coupled configuration of these elements. Accordingly, the seal 25 is mounted in its rest configuration in an outer radial groove 238 of the valve 23. The interface ring 27, placed around the valve 23, is designed to be inserted between the seal 25 and the inner peripheral surface 15 of the male element B during connection and uncoupling of the elements A and B. During connection, the forward movement of the male element B causes a movement of the interface ring 27 towards a position in which it is axially offset relative to the seal 25, while the auxiliary ring 29 exerts on the seal 25 forces tending to stretch the seal 25 in order to press it against the surface 15 of the male element B. As a variant, the seal 25 may be mounted in a slightly stretched configuration around the auxiliary ring 29, then stretched further under the action of the auxiliary ring 29 during the connection of the elements A and B. According to another variant, the seal 25 may be mounted compressed between the auxiliary ring 29 and the interface ring 27 in the uncoupled configuration, then stretched under the action of the auxiliary ring 29 during the connection of the elements A and B. In this third embodiment, the incline of the outer peripheral frustoconical surface 295 of the auxiliary ring 29 is suitable for increasing the radial component $E'_2$ exerted by the auxiliary ring 29 on the inner surface of the seal 25.

In the fourth embodiment shown in FIG. 8, the elements similar to the elements of the first embodiment bear identical reference numbers. In this fourth embodiment, the interface ring is a portion of the valve 23 and is radially inserted between the seal 25, that is housed in an inner groove of the female element A, and the end 11A of the male element B, during the coupling and uncoupling of the elements A and B. As in the previous embodiments, the forward movement of the male element B during the connection causes a movement of the portion of the valve 23 forming the interface ring towards a position in which it is axially offset relative to the seal 25. However, in this variant, the forward movement of the male element B causes the movement of the valve 23 away from the seat formed by the body 21 of the female element A before the seal 25 is placed against the surface 13 of the male element B, that is to say before the seal 25 interacts in a sealed manner with the surface 13 of the male element B and seals the connection of the elements A and B. Such a sealed interaction between the seal 25 and the surface 13 occurs in the coupled configuration of the elements A and B. It is then necessary to provide a provisional seal during the connection of the elements A and B. Accordingly, a flat seal 24 is provided at the inner shoulder 279 designed to receive in abutment the front end 11A of the male element B. The female element A of this fourth embodiment makes it possible to connect the elements A and B in two stages, with a single push of the male element B in contact with the valve 23 playing the role of the interface ring, until the valve 23 butts against the body 21. The forward movement of the valve 23 during the disconnection is limited by its pressing against the seat of the body 21.

The invention is not limited to the examples described and shown. In particular, irrespective of the embodiment, the frustoconical peripheral surfaces of the interface ring and of the auxiliary ring may comprise several portions of slope having different inclines. In particular, in the third embodiment, it may be advantageous to have two different inclines of the surface 295 of the auxiliary ring 29, in order, on the one hand, to stretch the seal 25, for its placement against the inner peripheral surface 15 of the male element B and, on the other hand, to keep the seal 25 against the surface 15.

The invention claimed is:

1. A female element of a connector for removable joining of ducts through which a pressurized fluid flows, the female element being able to receive a male element including a peripheral surface and an end surface, by fitment along a longitudinal axis of the female element, the peripheral surface being cylindrical adjacent the end surface, the female element comprising; a seal housed inside a body of the female element so as to interact in a sealed manner with the peripheral surface of the male element when fitted into the female element and an interface member housed inside the body and movable in translation parallel to the longitudinal axis of fitment, the interface member being axially movable by the male element during fitment of the male element into the female element from a first position, in which the interface member is positioned radially between the seal and the peripheral surface of the male element and such that the end surface of the male element can not directly contact the seal as the end surface extends through and beyond the seal within the female member, to a second position, in which the interface member is offset axially relative to the seal and the seal rests in a sealed manner on an area of the peripheral surface of the male element which area is spaced at a distance from the end surface of the male element sufficient so that the seal will not be in contact with the end surface and thus can not be damaged by protruding irregularities that may be present on the end surface of the male element as the interface member is moved between the first and second positions thereof.

2. The female connector element according to claim 1, wherein the interface member is moved axially from the second position to the first position during uncoupling of the female element relative to the male element fitted into the female element.

3. The female connector element according to claim 1, further including elastic return means axially pushing the interface member towards the first position.

4. The female connector element according to claim 1, wherein the interface member has a minimum thickness at an end closest to the seal in the second position of the interface member.

5. The female connector element according to claim 1, wherein the interface member includes a peripheral surface that is inclined relative to the longitudinal axis of fitment, the peripheral surface of the interface member receiving the seal pressing thereon when the interface member is positioned radially between the seal and the peripheral surface of the male element fitted into the female element.

6. The female connector element according to claim 1, further including loading means for loading the seal in a direction of the peripheral surface of the male element fitted into the female element.

7. The female connector element according to claim 6, wherein the loading means includes an auxiliary member that exerts an axial force on the seal directed against the movement of the interface member from the first position to the second position.

8. The female connector element according to claim 7, wherein the auxiliary member has a peripheral surface that is inclined relative to the longitudinal axis of fitment, the peripheral surface of the auxiliary member exerting on the seal a radial force directed towards the peripheral surface of the male element during fitment into the female element.

9. The female connector element according to claim 1, further including a valve for closing the female element, the valve being housed inside the body and movable axially in translation parallel to the longitudinal axis of fitment and against an elastic return means by the male element during fitment into the female element.

10. The female connector element according to claim 9, wherein the valve includes a groove for receiving the seal.

11. The female connector element according to claim 9, wherein the interface member slides, relative to the valve, against first elastic return means, while the valve slides relative to the body against second elastic return means, the first elastic means exerting a return force that is weaker than a return force of the second elastic means.

12. The female connector element according to claim 9, wherein the interface member is integral in movement with the valve.

13. The female connector element according to claim 12, further including a second seal placed in a shoulder of the interface member designed to receive in abutment the male element during fitment into the female element.

14. The female connector element according to claim 1, wherein an internal diameter of the seal when the interface member is in the first position is greater than an internal diameter of the seal when the interface member is in the second position, the seal interacting in a sealed manner with the peripheral surface of the male element during fitment into the female element when the interface member is in the second position.

15. The female connector element according to claim 1, wherein, during the movement of the interface member from a position corresponding to an uncoupled configuration of the female element to the second position, the seal reaches at least one configuration in which an internal diameter of the seal is greater than an internal diameter of the seal when the female element is in an uncoupled configuration.

16. The female connector element according to claim 1, wherein the seal stretches against an inner peripheral surface of the male element during fitment into the female element during the movement of the interface member from the first position to the second position.

17. The female connector element according to claim 1, further including a mechanism for locking the male element during fitment and in the fitted configuration in the female element, the mechanism including locking members interacting with the peripheral surface of the male element and a locking ring that is movable in translation relative to the body and parallel to the longitudinal axis of fitment, the locking ring being able, under the action of elastic return means, to radially push the locking members in a direction of the longitudinal axis of fitment along a peripheral surface of the body that is inclined relative to the longitudinal axis of fitment.

18. A Connector for removably joining ducts through which a pressurized fluid flows, comprising a smooth cylindrically terminated male element, including a peripheral surface and an end surface, and a female element that fit into one another, the peripheral surface being cylindrical adjacent the end surface, the female element including a seal housed inside a body of the female element that interacts in a sealed manner with the peripheral surface of the male element fitted into the female element and an interface member housed inside the body and movable in translation parallel to a longitudinal axis of fitment of the male and female elements, the interface member being moved axially by the male element during fitment into the female element from a first position, in which the interface member is positioned radially between the seal and the peripheral surface of the male element and such that the end surface of the male element can not directly contact the seal as the end surface extends through and beyond the seal within the female member, to a second position, in which the interface member is offset axially relative to the seal and the seal rests in a sealed manner on an area of the peripheral surface of the male element which area is spaced at a distance from the end surface of the male element sufficient so that the seal will not be in contact with the end surface and thus can not be damaged by protruding irregularities that may be present on the end surface of the male element as the interface member is moved between the first and second positions thereof.

* * * * *